March 27, 1962 D. F. PALAZZO ET AL 3,026,683
SEPARATION OF HYDROGEN AND METHANE
Filed March 7, 1961
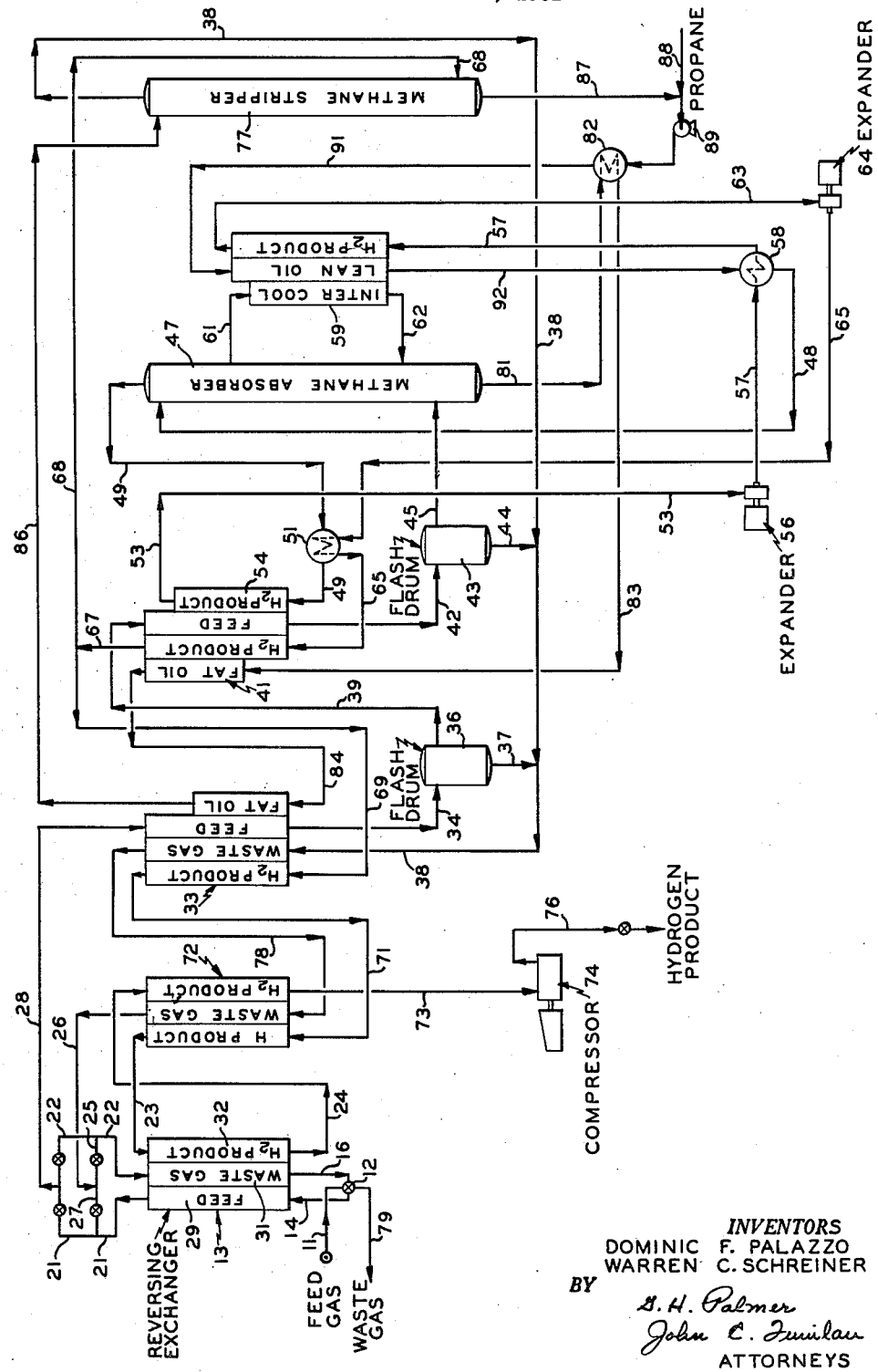
INVENTORS
DOMINIC F. PALAZZO
WARREN C. SCHREINER
BY
*B. H. Palmer*
*John C. Funilau*
ATTORNEYS

3,026,683
SEPARATION OF HYDROGEN AND METHANE
Dominic F. Palazzo, Brooklyn, and Warren C. Schreiner, East Norwich, N.Y., assignors to The M. W. Kellogg Company, New York, N.Y., a corporation of Delaware
Filed Mar. 7, 1961, Ser. No. 93,891
12 Claims. (Cl. 62—17)

The present invention relates to a low temperature gas separation process. One aspect of the invention relates to the separation of hydrogen and/or methane from mixtures of the same. A particular aspect of the invention relates to a low temperature process for the recovery of hydrogen of high purity from mixtures containing hydrogen, methane and heavier hydrocarbons. The present application is a continuation-in-part of our co-pending application Serial No. 548,631, filed November 23, 1955, now abandoned.

There is a growing demand in industry for high purity hydrogen. Such processes as the production of alcohols from esters or aldehydes, amines from nitriles, and cyclo-paraffins from aromatics all require large amounts of high purity hydrogen which must be obtained at the lowest possible cost. In addition, hydrogen is used in the upgrading of cycle oils by hydrogenation and under some circumstances, low cost high purity hydrogen is preferred for use in this type of process rather than the relatively impure hydrogen normally used.

With the advent of catalytic reforming, a potentially large and cheap source of high purity hydrogen has become available. Many catalytic reforming processes such as platinum reforming produce large quantities of hydrogen-containing gases as by-products. A number of other conventional refinery processes also produce by-product gases containing appreciable amounts of hydrogen. Unfortunately, however, the hydrogen-containing gases produced in the various refinery processes contain considerable quantities of methane and heavier hydrocarbons which must be removed if hydrogen of sufficient purity is to be obtained.

One method of recovering hydrogen from such mixtures of hydrogen and hydrocarbons is to lower the temperature of the mixture so that the hydrocarbons condense. Cooling and separating condensed hydrocarbons is effective to a certain extent; however, some methane always remains and for many applications this methane must be removed if hydrogen of the desired degree of purity is to be obtained. If a hydrogen-methane mixture is cooled to a temperature just above the freezing point of methane, about 2 to about 10 mol percent, more usually about 2 to about 6 mol percent, methane remains uncondensed because of the methane partial pressure. Since for many applications hydrogen having a purity of 99 mol percent or more is desired, it is necessary to remove this residual methane in order to obtain hydrogen of the required degree of purity. In order to remove residual methane by condensation, it would be necessary to cool the hydrogen and methane mixture to below the freezing point of methane and under these circumstances, considerable difficulty would be experienced in removing the deposits of solid methane which would be formed.

Previously, it has been known to subject these mixtures of hydrogen and methane to countercurrent contacting with liquid nitrogen whereby the methane is absorbed in the nitrogen. This process has been satisfactory when used to produce hydrogen for ammonia synthesis. It is unsatisfactory, however, for many other uses because the hydrogen recovered from such a process is contaminated with substantial amounts of vaporized nitrogen.

Hydrogen-methane mixtures have also been contacted with various other absorbents to remove methane from the gaseous feed; however, none of these processes has proven satisfactory in preparing hydrogen of high purity because the absorbent has lacked one or more of several important properties. Thus, the absorbent must have low solvent power for hydrogen. If hydrogen has substantial solubility, significant amounts of hydrogen will be absorbed and lost from the product or, if not lost, will make necessary complicated procedures to recover it from the rich absorbent. The absorbent must have high solvent power for methane. If methane is not highly soluble, then the absorption process cannot produce hydrogen of high purity economically. Accordingly, the relative volatility of hydrogen with respect to methane, i.e., the ratio of the solubility of methane to that of hydrogen, with reference to the absorbent involved must be high. The relative volatility referred to is a direct measure of the selectivity of the absorbent. Substantial hydrogen enrichment by absorption is only possible if the absorbent is highly selective. Hence, economical production of high purity hydrogen using absorption is only possible with an absorbent having high selectivity. Finally, the absorbent must have a low vapor pressure at the conditions of operation. If its vapor pressure is substantial, not only will absorbent be lost through vaporization but the absorbent will contaminate the product defeating the purpose of the process.

It is, therefore, a principal object of this invention to provide an improved process for the separation of hydrogen and/or methane from mixtures of the same.

Another object of the invention is to provide an improved process for the purification of hydrogen contaminated with methane.

Another object of the invention is to provide an improved process for the selective absorption of methane from its mixture with hydrogen whereby hydrogen losses in the absorbent are substantially reduced.

Various other objects and advantages of the invention will be apparent from the following detailed discussion and description.

In accordance with the improved method of the invention, hydrogen contaminated with methane is contacted with a liquefied normally gaseous hydrocarbon selected from the group consisting of $C_2$ and $C_3$ hydrocarbons in an absorption zone maintained at a temperature of not less than about $-296°$ F. but less than about $-257°$ F. and a pressure above about 100 p.s.i.a. to selectively absorb methane from the feed and produce a gas of high hydrogen purity. In the event that the feed gas contains substantial amounts of methane and heavier hydrocarbons, it is contemplated to cool the feed gas in one or more stages to condense hydrocarbons, to separate the condensate and to pass only the uncondensed hydrogen contaminated with methane to the absorption zone.

In one aspect of the invention, the enriched absorbent is regenerated for reuse by contacting the rich absorbent with a portion of the purified hydrogen recovered from the absorption zone.

We have found that, under certain specific conditions, certain absorbents, namely, liquefied $C_2$ and $C_3$ hydrocarbons, possess to a remarkable degree all of the properties previously mentioned as desirable in a selective absorbent for the purification of hydrogen contaminated with methane. Under the low temperature conditions used, methane is highly soluble while hydrogen is only slightly soluble in liquefied $C_2$ and $C_3$ hydrocarbons. Consequently, the relative volatility of hydrogen with respect to methane and, accordingly, the selectivity of the absorbent for the separation of methane from hydrogen is unusually high. At the same time, since temperatures are maintained at low levels not far above the freezing points of the hydrocarbons involved, the vapor pressure of the absorbent is negligible. Ethane and propane are preferred absorbents because of lower cost and availability. Propane is most preferred because of its lower freezing point and better selectivity.

As indicated, the absorption zone is maintained at a temperature not less than about −296° F. but less than about −257° F. The temperature is preferably maintained between about −275° F. and about −295° F. The importance of these temperature conditions is apparent from the data in Table I.

TABLE I

| Temperature, °F. | Ethane | | | Propane | | |
|---|---|---|---|---|---|---|
| | $K_{H_2}$ | $K_{C_1}$ | Rel. Vol. | $K_{H_2}$ | $K_{C_1}$ | Rel. Vol. |
| 100 | | | | 38 | 8.7 | 4.35 |
| 50 | 21 | | | 52 | 7.3 | 7.10 |
| 0 | 40 | 4.3 | 9.3 | 66 | 5.70 | 11.6 |
| −50 | 60 | 3.5 | 17.2 | 88 | 4.30 | 20.4 |
| −100 | 80 | 2.65 | 30 | 110 | 2.70 | 40 |
| −150 | 103 | 1.20 | 86 | 135 | 1.35 | 100 |
| −200 | 130 | 0.45 | 290 | 185 | 0.46 | 400 |
| −250 | 195 | 0.10 | 1,950 | 275 | 0.10 | 2,750 |
| −290 | ¹ 350 | 0.023 | ¹ 15,000 | ¹ 500 | 0.021 | ¹ 25,000 |

¹ Approximate value.

The tabulated K values are vapor-liquid equilibrium constants in a two-component system. Thus, $K_{H_2}$ appearing under ethane in the table is the quotient obtained by dividing the mol fraction of hydrogen appearing in the vapor phase of the hydrogen-ethane system by the mol fraction of hydrogen appearing in the liquid phase of the same system at equilibrium. The K constants are functions of pressure; the data in Table I correspond to a pressure of 300 p.s.i.a. The K constant is a measure of solubility as will be apparent from its definition, the lower the K, the greater the solubility. Referring to the table, it is seen that with decreasing temperature, the solubility of methane in either absorbent rises while the solubility of hydrogen in either absorbent declines. It is especially noteworthy, however, that this relationship is not linear but is rather gradual at temperatures above about −150° F. and very pronounced at temperatures below about −150° F. For example, methane is roughly seventy times as soluble in liquid propane at 300 p.s.i.a. and −290° F. as it is in the same solvent at 300 p.s.i.a. and −150° F. whereas the proportion of solubility at −150° F. and −300 p.s.i.a. to that at 100° F. and 300 p.s.i.a. is only about seven. The relative volatility of hydrogen with respect to methane, obtained by dividing $K_{H_2}$ by $K_{C_1}$, increases with declining temperature in a fashion still more marked than the solubility of methane. Hence, at the low temperature conditions used, the $C_2$ and $C_3$ hydrocarbon absorbents have selectivities for the separation of methane from hydrogen far exceeding those obtainable at higher temperatures with the same absorbents.

Other liquefied hydrocarbon absorbents are not equivalents for purposes of this invention. Although small amounts of methane will be present in the absorbent used when the absorbent is regenerated and recirculated, obviously liquefied methane could not be a major constituent of the absorbent used in the present process. Liquefied $C_4$ and heavier hydrocarbons are not operative in the process because they are solids at the temperature conditions used.

As indicated, low temperatures are maintained in the absorption zone but these temperatures are not less than about −296° F. Lower temperatures are not feasible because of problems attending the deposition of solid methane. Temperatures below the boiling point of methane at the absorption pressure are used, however, both to take advantage of the unusual selectivities possessed by the absorbents at those temperatures and to permit removal of considerable quantities of methane by condensation and vapor-liquid separation prior to absorbing the residual methane.

As indicated, pressures above about 100 p.s.i.a. are maintained in the absorption zone. Substantial superatmospheric pressures are used in connection with the invention for two principal reasons: first, product gases can be expansion cooled and their refrigeration recovered so as to lessen or completely eliminate the need for extraneous refrigerants, and second, as the pressure of the hydrogen-methane mixture is increased, the temperature at which methane condenses from the mixture is also increased thereby reducing refrigeration requirements. Still a third factor involved in the selection of an operating pressure for the absorption zone is the pressure at which the feed gas is available. If the feed gas is available at a pressure above about 300 p.s.i.a., the operating pressure of the absorption zone will normally be about the same as the feed gas pressure in order that the purified hydrogen can be recovered at as high a pressure as possible, since many subsequent uses for the purified hydrogen call for high pressures. On the other hand, if the feed gas is available at a pressure below about 300 p.s.i.a., it is generally preferred to compress the gas, if necessary, to permit maintenance of the absorption zone at a pressure of about 100 p.s.i.a. to about 300 p.s.i.a. Where compression of the feed gas is required, it will not usually be advantageous to compress to a pressure above about 300 p.s.i.a. because above this pressure, there is little increase in the temperature at which methane condenses with rising pressure.

The methane content of the hydrogen-containing gas introduced into the absorption zone is preferably less than about 10 mol percent. Since the method of the invention is useful to produce hydrogen of 99.95 plus mol percent purity, the method is useful even where the feed gas contains only very small amounts of methane. As mentioned, where the feed gas contains substantial amounts of methane and heavier hydrocarbons, it is preferred to cool the gas and separate condensed hydrocarbons prior to the absorption step. Where such feeds are cooled to temperatures within the range of those maintained in the absorption zone in accordance with the preferred operation, the resulting gas feed to the absorption zone will contain residual methane in amounts of about 2 to about 10 mol percent, more usually about 2 to about 6 mol percent.

The absorption medium which is used to absorb methane from the hydrogen becomes less effective for this purpose as it absorbs larger quantities of methane and hence should be treated for the removal of this methane if it is to be used further to absorb methane from the hydrogen. According to one aspect of our invention, removal of methane from the hydrogen is accomplished by contacting the hydrogen-methane mixture with the absorption medium in an absorption zone. This is conveniently accomplished by continuous, countercurrent contact in an absorption tower. The relatively pure hydrogen is withdrawn from the upper portion of the absorption tower while the rich absorbent is withdrawn from the lower portion of the absorption tower and is then stripped of absorbed methane in a separate stripping zone. This stripping is conveniently accomplished by countercurrently contacting the absorption medium containing absorbed methane with a portion of the relatively pure hydrogen. The portion of hydrogen used for stripping methane from the absorption medium becomes contaminated with methane and is withdrawn from the upper portion of the stripping tower while the absorption medium is withdrawn from the lower portion of the stripping tower and is then sufficiently pure to be used again in the absorbing tower.

Removal of absorbed methane from the absorption medium in the stripping zone is preferably carried out at temperatures of about −180 to about −255° F., more usually about −200 to about −240° F. The temperature in the stripping zone should not, of course, be high enough to cause substantial vaporization of the absorption medium.

Since the stripping zone is usually operated at a higher temperature than the absorption zone, it is usually necessary to warm the absorption medium prior to passing it into the stripping zone. Warming of the absorption medium containing absorbed methane can be conveniently accomplished by contacting it in indirect heat exchange relationship with warmer absorption medium which has already been stripped of absorbed methane or it can be accomplished by utilizing the cold absorption medium to supply part of the cooling duty needed to cool the incoming feed stream at various stages of the process. The pressure in the stripping zone is preferably about 0 to about 15 p.s.i.g., although operation of the stripping zone is not limited to this range of pressures.

If the mixture of gas from which hydrogen is to be recovered contains hydrocarbons heavier than methane or contains large amounts of methane, it is desirable to remove as much of the hydrocarbons as possible by condensation prior to contacting the methane-hydrogen mixture with the absorption medium. Frequently, as in the case where hydrogen is being recovered from naphtha reforming gas, a mixture from which it is desired to obtain relatively pure hydrogen comprises mostly hydrogen and normally gaseous hydrocarbons and small quantities of water and heavier hydrocarbons. Such mixtures are frequently available at relatively high temperatures and it is usually desirable to effect the condensation of the water and hydrocarbons by cooling the incoming feed in a heat exchanger or series of heat exchangers in which the cooling duty is supplied in whole or in part by the cold hydrogen product and waste gases. In a preferred embodiment of our invention, cold hydrogen product and cold waste gases are used to supply the cooling duty needed to condense water and hydrocarbons from the incoming feed. The waste gas comprises hydrocarbons which have been condensed and separated from the feed and also that portion of the hydrogen product which has been used to strip absorbed methane from the absorption medium used in connection with our invention.

For a better understanding of our invention, reference should be had to the accompanying drawing which is a diagrammatic illustration in elevation of a suitable arrangement of apparatus for carrying out a preferred embodiment of our invention.

In the drawing, 10,040 pounds per hour of naphtha reformer gas having the composition shown in Table II enter as feed through conduit 11 at a pressure of 135 p.s.i.a. and a temperature of 100° F. The feed passes through valve 12 into a reversing heat exchanger 13 through conduit 14. In exchanger 13 feed passing through passageway 29 is cooled to a temperature of −55° F., by indirect countercurrent heat exchange with waste gas passing through passageway 31 and hydrogen product passing through passageway 32. The feed stream enters exchanger 13 through valve 12 and conduit 14 and leaves through conduits 21 and 28. The waste gas stream obtained as explained below, enters exchanger 13 through conduit 26, conduit 25 and conduit 22 and leaves through conduit 16 and valve 12 and the hydrogen product enters exchanger 13 through conduit 23 and leaves through conduit 24. Valve 12 is designed so that the feed stream from conduit 11 may be passed to either conduit 14 and passageway 29 or conduit 16 and passageway 31 while the waste gas stream is always passed to conduit 79 regardless of whether it has passed through passageway 29 and conduit 14 or passageway 31 and conduit 16. The feed and waste gas streams are not allowed to mix at any time.

Due to the cooling effect of the hydrogen product and waste gas streams, the water which is contained in the feed is deposited in passageway 29 as ice. Before these deposits of ice build up sufficiently to interfere with the proper operation of the heat exchanger, the paths of the feed and waste gas are reversed so that the waste gas passes through passageway 29 and the feed passes through passageway 31. This reversal is accomplished by passing the feed stream from valve 12 through conduit 16 to passageway 31 and allowing it to leave exchanger 13 through conduits 22 and 28. At the same time, the waste gas passes through conduit 26, conduit 27, and conduit 21 to passageway 29 and then leaves the exchanger through conduit 14. During this period of reversed flow the ice previously deposited in passageway 29 is evaporated by the waste gas now flowing through passageway 29, while at the same time new deposits of ice are being formed by the passage of the feed stream through passageway 31. In this way, by periodically reversing the flow of the feed and waste gas streams, deposits of ice sufficiently large to interfere with the proper operation of the heat exchanger are prevented.

After the feed stream is cooled and contained water is removed in exchanger 13, the feed stream passes through conduit 28 to a heat exchanger 33. In exchanger 33 the feed is cooled to a temperature of −200° F., by indirect countercurrent heat exchange with cold hydrogen product and waste gas streams. Part of the cooling duty in the cold end of exchanger 33 is also supplied by propane which has been used to absorb residual methane from the hydrogen product. From exchanger 33 the feed passes through conduit 34 to a separator drum 36 in which the hydrocarbons condensed by the cooling of the feed in exchanger 33 are separated. The separated hydrocarbons, having the composition shown in Table III, are withdrawn from separator drum 36 through conduit 37 and are combined with the waste gas stream in conduit 38. Separator drum 36 is operated at a temperature of −200° F. and a pressure of 132 p.s.i.a.

From separator drum 36 the feed passes through conduit 39 to a heat exchanger 41. In exchanger 41, the feed is further cooled by indirect countercurrent heat exchange with hydrogen product streams. Additional cooling is attained in the warm end of exchanger 41 by the use of propane which has been used to absorb residual methane from the hydrogen product. In exchanger 41, the feed is cooled to a temperature of −290° F. thereby condensing all the $C_2$ and heavier hydrocarbons and also a considerable amount of methane. The feed stream passes from exchanger 41 through conduit 42 to a separator drum 43 wherein the condensed hydrocarbons are separated. The hydrocarbons separated in separator drum 43 have a composition as shown in Table IV and are withdrawn through conduit 44 and combined with the waste gas stream in conduit 38. Drum 43 is operated at a pressure of 131 p.s.i.a. and a temperature of −290° F.

Following removal of the condensed hydrocarbons, the feed stream, which now comprises 94.7 mol percent hydrogen product and 5.3 mol percent residual methane, passes through conduit 45 to an absorption tower 47. In absorption tower 47, the feed introduced through conduit 45 is countercurrently contacted with liquid propane introduced through conduit 48. Substantially all of the residual methane is absorbed by the liquid propane and 2,668 pounds per hour of hydrogen product comprising 99.95 mol percent hydrogen and 0.05 mol percent methane are withdrawn from absorption tower 47 through conduit 49. Absorption tower 47 is operated at a pressure of 130 p.s.i.a. with a bottom temperature of −272° F. and a top temperature of −289° F.

Hydrogen product in conduit 49 passes to a heat exchanger 51 where it is cooled to a temperature of −295° F. by indirect contact with expanded hydrogen product and then passes through conduit 49 to heat exchanger 41 where it passes through passageway 54 and supplies cooling duty to the cold end of exchanger 41. From passageway 54 the hydrogen product passes through conduit 53 at a temperature of −280° F. to expander 56. In expander 56 the hydrogen product is expanded to a pressure of 62 p.s.i.a. and its temperature is lowered thereby to −312° F.

Expanded hydrogen product passes through expander 56 through conduit 57 to heat exchanger 58 where it is used to indirectly cool propane to a suitable temperature for use in absorption tower 47. From exchanger 58 the hydrogen product continues through conduit 57 at a temperature of −295° F., and enters heat exchanger 59. In exchanger 59 the hydrogen product is passed in indirect countercurrent heat exchange with warmer propane whereby the propane is cooled. In addition, material from absorption tower 47 is withdrawn through conduit 61 at a temperature of −275° F., and is passed through a separate passageway in the cold end of exchanger 59 whereby its temperature is lowered to −281° F. by indirect countercurrent heat exchange with the hydrogen product. This material is then returned to absorption tower 47 through conduit 62. By withdrawing material from absorption tower 47, cooling it in exchanger 59 and then returning it to the absorption tower, it is possible to decrease the overall temperature rise in the absorption tower. This decreases the flow rate of propane required which in turn decreases the amount of the hydrogen product which must be used to strip absorbed methane from the propane. Since as explained below, the hydrogen product which is used to strip the propane is subsequently discarded as waste gas, this intercooling of the material in absorption tower 47 results in a greater yield of hydrogen product.

Hydrogen product leaves exchanger 59 through conduit 63 at a temperature of −268° F. and passes to expander 64 in which it is expanded to a pressure of 27 p.s.i.a. with a corresponding temperature drop to −306° F. From expander 64 the hydrogen product passes through conduit 65 to heat exchanger 51 where it is indirectly contacted with the hydrogen product in conduit 49. In this way, the hydrogen product in conduit 49 is cooled to a sufficiently low temperature so that it may be utilized in the cold end of exchanger 41 to cool the feed stream to a temperature below the temperature at which the hydrogen product is withdrawn from absorption tower 47. From exchanger 51, the hydrogen product in conduit 65 continues at a temperature of −300° F. to exchanger 41 where it is again used to cool the feed stream. By expanding the hydrogen product following its first use in exchanger 41 and then using the expanded hydrogen to supply further cooling duty in exchanger 41, it is possible to cool the feed to a much lower temperature than would otherwise be possible. Furthermore, by using the expanded hydrogen in conduit 65 to cool the hydrogen in conduit 49, before the hydrogen in conduit 49 enters exchanger 41, it is possible to use the hydrogen in conduit 49 to cool the feed to a lower temperature than the temperature at which the hydrogen product is withdrawn from the absorption zone. At the same time, the hydrogen in conduit 65 remains sufficiently cold so that it may be used for the same purpose.

The hydrogen product which enters exchanger 41 through conduit 65, is withdrawn through conduit 67. Part of this product is diverted through conduit 68 at the rate of 459 pounds per hour to be used in stripping absorbed methane from the propane. The remainder of the hydrogen product from conduit 67 passes through conduit 69 at a temperature of −223° F., and a pressure of 26.8 p.s.i.a. to exchanger 33.

In exchanger 33 the hydrogen product is passed in indirect countercurrent heat exchange with the feed stream as a result of which its temperature is raised to −86° F. From exchanger 33 the hydrogen product passes through conduit 71 to heat exchanger 72. In exchanger 72 the cold hydrogen product stream and the cold waste gas stream are both warmed by indirect countercurrent heat exchange with warm hydrogen product. The hydrogen product stream which entered exchanger 72 through conduit 71 leaves exchanger 72 at a temperature of −63° F. and passes through conduit 23 to passageway 32 in heat exchanger 13. In exchanger 13 the hydrogen product is contacted in indirect countercurrent heat exchange with the incoming feed stream. The hydrogen product passes through passageway 32 continuously while the feed and waste gas streams alternate between passageways 29 and 31 as previously explained. The hydrogen product passes from passageway 32 through conduit 24 at a temperature of 92° F. to heat exchanger 72 where it is passed in indirect countercurrent heat exchange with cold hydrogen product and waste gas streams as previously discussed. From exchanger 72, the hydrogen product passes through conduit 73 at a temperature of 56° F., and a pressure of 20.0 p.s.i.a. to compressor 74 in which it is compressed to a pressure of 135 p.s.i.a. The hydrogen product is then recovered from the system at the rate of 2,209 pounds per hour through conduit 76 at a temperature of 100° F.

That portion of the hydrogen product which is diverted through conduit 68 to be used to strip absorbed methane from the propane passes through conduit 68 to the lower portion of a stripping tower 77. In stripping tower 77 the hydrogen passes in countercurrent contact with the propane and thereby strips methane from the propane. The hydrogen-methane mixture is then withdrawn from the upper portion of stripping tower 77 as waste gas at the rate of 1,629 pounds per hour through conduit 38. The waste gas in conduit 38 is combined with condensed hydrocarbons from conduits 44 and 37 and combined waste gas stream passes from conduit 38 to heat exchanger 33. In exchanger 33, the waste gas stream is passed in indirect countercurrent heat exchange with the feed stream and then passes through conduit 78 at a temperature of −86° F. to heat exchanger 72 where it is warmed to a temperature of −63° F. by indirect countercurrent heat exchange with warm hydrogen product. Exchanger 72 is utilized to warm the cold waste gas and hydrogen product streams in order to reduce the temperature difference experienced in exchanger 13. If the cold waste gas were allowed to enter exchanger 13 without being first warmed in exchanger 72, the result would be that the waste gas stream would not be able to remove the ice deposits in the reversing passageways of exchanger 13 as rapidly as they were formed. By the use of exchanger 72, it is possible to maintain the temperature difference in exchanger 13 sufficiently low and at the same time maintain the temperature of the waste gas in exchanger 13 sufficiently high so that efficient removal of the ice deposits may be accomplished. From exchanger 72, the waste gas stream passes through conduit 26 and conduit 22 to passageway 31 of heat exchanger 13. From exchanger 13, the waste gas passes through conduit 16 and valve 12 and is withdrawn from the system through conduit 79 at the rate of 7,831 pounds per hour at a temperature of 92° F., and a pressure of 18.5 p.s.i.a. The waste gas withdrawn from the system has the composition shown in Table V. When exchanger 13 is reversed, the waste gas instead of flowing through passageway 31 goes through the conduits 26, 27 and 21 to passageway 29 and is withdrawn through conduit 14. In either case, the waste gas, by passing through the passageway of exchanger 13 which was used in the previous cycle to cool the incoming feed, is able to remove the deposits of ice formed during the cooling of the feed stream and the water thus formed is removed with the waste gas, as shown in Table V.

The propane which was used to absorb methane from the hydrogen in absorption tower 47 is withdrawn from the lower portion of absorption tower 47 through conduit 81 and passes to a heat exchanger 82 where it is indirectly contacted with warmer propane thereby raising its temperature to −250° F. From exchanger 82, the propane containing absorbed methane passes through conduit 83 to exchanger 41 where its temperature is further raised by indirect countercurrent contact with the feed stream. From exchanger 41, the propane passes through conduit 84 to exchanger 33 where it is further warmed by indirect countercurrent heat exchange with the feed stream. From exchanger 33, the propane passes through conduit 86 at a temperature of −207° F., to the upper portion of stripping tower 77. In stripping tower 77, methane is removed from the propane by countercurrent contact with a portion of hydrogen product. Stripping tower 77 is operated at a pressure of 23 p.s.i.a. with a bottoms temperature of −238° F. and a temperature in its upper portion of −228° F. From the bottom of stripping tower 77, 15,200 pounds per hour of propane which is relatively free of methane is withdrawn through conduit 87. Make-up propane can be added through conduit 88 if needed. The propane in conduit 87 passes to heat exchanger 82 by means of pump 89. In exchanger 82, the propane from conduit 87 is cooled to a temperature of −263° F. by indirect heat exchange with propane containing absorbed methane and is then passed through conduit 91 to exchanger 59. In exchanger 59, the propane is further cooled to a temperature of −281° F., and then passes through conduit 92 to exchanger 58. In exchanger 58, the propane is cooled to a temperature of −298° F. by indirect contact with cold expanded hydrogen product and is then passed through conduit 48 to the upper part of absorption tower 47 where it is again used to absorb methane from the hydrogen product.

TABLE II

*Composition of Feed Gas*

| | Mol percent |
|---|---|
| $H_2$ | 83.60 |
| $CH_4$ | 6.33 |
| $C_2$ hydrocarbons | 4.69 |
| $C_3$ hydrocarbons | 4.15 |
| $C_4$ and heavier hydrocarbons | 0.48 |
| $H_2S$ | 0.05 |
| $H_2O$ | 0.70 |
| | 100.00 |

TABLE III

*Composition of Waste From Separator Drum 36*

| | Mol percent |
|---|---|
| $H_2$ | 0.34 |
| $CH_4$ | 5.90 |
| $C_2H_2$ | 44.52 |
| $C_3H_8$ | 43.62 |
| $C_4H_{10}$ and heavier | 5.08 |
| $H_2S$ | 0.54 |
| | 100.00 |

TABLE IV

*Composition of Waste Stream From Separator Drum 43*

| | Mol percent |
|---|---|
| $H_2$ | 0.25 |
| $CH_4$ | 69.82 |
| $C_2H_6$ | 29.12 |
| $C_3H_8$ | 0.81 |
| | 100.00 |

TABLE V

*Composition of Waste Gas*

| | Mol percent |
|---|---|
| $H_2$ | 46.7 |
| $CH_4$ | 20.5 |
| $C_2$ hydrocarbons | 15.3 |
| $C_3$ hydrocarbons | 13.5 |
| $C_4$ and heavier hydrocarbons | 1.5 |
| $H_2S$ | 0.2 |
| $H_2O$ | 2.3 |
| | 100.0 |

We claim:

1. In a process for the recovery of purified hydrogen from a relatively impure hydrogen stream contaminated with methane and heavier hydrocarbons comprising cooling said stream to condense a portion of said hydrocarbons, separating hydrogen contaminated with methane from said condensed hydrocarbons, contacting said separated hydrogen contaminated with methane in an absorption zone with a scrubbing liquid, and recovering purified hydrogen from said absorption zone, the improved method for the recovery of hydrogen of high purity which comprises using a liquefied normally gaseous hydrocarbon selected from the group consisting of $C_2$ and $C_3$ hydrocarbons as said scrubbing liquid and maintaining said absorption zone at a temperature of not less than about −296° F. but less than about −257° F. and a pressure above about 100 p.s.i.a.

2. In a process for the recovery of purified hydrogen from a relatively impure hydrogen stream contaminated with methane and heavier hydrocarbons comprising cooling said stream to condense a portion of said hydrocarbons, separating hydrogen contaminated with methane from said condensed hydrocarbons, contacting said separated hydrogen contaminated with methane in an absorption zone with a scrubbing liquid, and recovering purified hydrogen from said absorption zones, the improved method for the recovery of hydrogen of high purity which comprises using a liquefied normally gaseous hydrocarbon selected from the group consisting of $C_2$ and $C_3$ hydrocarbons as said scrubbing liquid and maintaining said absorption zone at a temperature of not less than about −296° F. but less than about −275° F. and a pressure above about 100 p.s.i.a.

3. In a process for the recovery of purified hydrogen from a relatively impure hydrogen stream contaminated with methane and heavier hydrocarbons comprising cooling said stream to condense a portion of said hydrocarbons, separating hydrogen contaminated with about 2 to about 10 mol percent methane from said condensed hydrocarbons, contacting said separated hydrogen contaminated with methane in an absorption zone with a scrubbing liquid, and recovering purified hydrogen from said absorption zone, the improved method for the recovery of hydrogen of high purity which comprises using a liquefied normally gaseous hydrocarbon selected from the group consisting of $C_2$ and $C_3$ hydrocarbons as said scrubbing liquid and maintaining said absorption zone at a temperature of not less than about −296° F. but less than about −257° F. and a pressure above about 100 p.s.i.a., whereby said recovered purified hydrogen is of higher purity than said separated hydrogen contaminated with about 2 to about 10 mol percent methane.

4. In a process for the recovery of purified hydrogen from a relatively impure hydrogen stream contaminated with methane and heavier hydrocarbons comprising cooling said stream to condense a portion of said hydrocarbons, separating hydrogen contaminated with about 2 to about 6 mol percent methane from said condensed hydrocarbons, contacting said separated hydrogen contaminated with methane in an absorption zone with a scrubbing liquid, and recovering purified hydrogen from said absorption zone, the improved method for the recovery of hydrogen of high purity which comprises using a liquefied normally gaseous hydrocarbon selected from the group consisting of $C_2$ and $C_3$ hydrocarbons as said scrubbing liquid and maintaining said absorption zone at a temperature of not less than about −296° F. but less than about −275° F. and a pressure above about 100 p.s.i.a., whereby said recovered purified hydrogen has a purity of at least 99 mol percent.

5. In a process for the separation of hydrogen from a mixture containing hydrogen and methane comprising contacting said mixture with a liquid hydrocarbon in an absorption zone and recovering purified hydrogen from said absorption zone, the improved method for the recovery of hydrogen of high purity without substantial absorption of hydrogen by the hydrocarbon liquid in the absorption zone which comprises using a liquefied normally gaseous hydrocarbon selected from the group consisting of $C_2$ and $C_3$ hydrocarbons as said hydrocarbon liquid and maintaining said absorption zone at a temperature of not less than about $-296°$ F. but less than about $-257°$ F. and a pressure above about 100 p.s.i.a.

6. The improved method of claim 5 in which said liquefied normally gaseous hydrocarbon is propane.

7. The process for the separation of hydrogen from a mixture comprising hydrogen and methane which comprises contacting said mixture with an absorbent comprising a liquefied stream of normally gaseous hydrocarbon selected from the group consisting of $C_2$ and $C_3$ hydrocarbons in an absorption zone whereby methane is absorbed by said hydrocarbon absorbent, separating purified hydrogen from said absorption zone, contacting a portion of said purified hydrogen with said hydrocarbon absorbent containing absorbed methane thereby stripping methane from said hydrocarbon absorbent, recycling thus stripped absorbent to said absorption zone and recovering the remainder of said purified hydrogen as a product of the process.

8. The process of claim 7 in which the normally gaseous hydrocarbon is propane.

9. In a process for the recovery of hydrogen from a mixture comprising hydrogen, methane, and heavier hydrocarbons in which said mixture is cooled, thereby condensing hydrocarbon impurities, hydrogen contaminated with methane is separated and withdrawn, methane is removed from the separated hydrogen by countercurrently contacting said separated hydrogen with a scrubbing liquid in an absorption zone and purified hydrogen is recovered from said absorption zone as a product of the process, the improvement which comprises using a liquefied stream of a normally gaseous hydrocarbon selected from the group consisting of $C_2$ and $C_3$ hydrocarbons as said scrubbing liquid whereby methane is absorbed by said liquid normally gaseous hydrocarbon and removing said absorbed methane from said liquid normally gaseous hydrocarbon by countercurrently contacting said liquid normally gaseous hydrocarbon with a portion of said hydrogen product.

10. The process of claim 9 in which the normally gaseous hydrocarbon is propane.

11. The process for the recovery of a gas comprising at least 95 mol percent hydrogen from a gaseous mixture comprising hydrogen, water vapor and normally gaseous hydrocarbons, said mixture containing methane and heavier hydrocarbons and which comprises cooling said mixture whereby water is removed from said mixture, further cooling said mixture whereby a portion of said normally gaseous hydrocarbons is condensed, removing said condensed hydrocarbons, further cooling said mixture whereby a further portion of said hydrocarbons is condensed whereby said mixture then comprises hydrogen contaminated with methane and removing said further portion of said hydrocarbons, countercurrently contacting said mixture comprising hydrogen contaminated with methane in an absorption zone with a liquefied stream of a normally gaseous hydrocarbon selected from the group consisting of $C_2$ and $C_3$ hydrocarbons whereby methane from said mixture is absorbed in said liquefied stream of normally gaseous hydrocarbon, recovering a gas comprising hydrogen from said absorption zone as a product of the process and countercurrently contacting a portion of said hydrogen product with said liquefied stream of normally gaseous hydrocarbon whereby methane is stripped from said liquefied stream of normally gaseous hydrocarbon containing absorbed methane by said portion of said hydrogen product.

12. The process of claim 11 in which said normally gaseous hydrocarbon is liquid propane.

References Cited in the file of this patent
UNITED STATES PATENTS

| | | |
|---|---|---|
| 2,250,716 | Letgatski | July 29, 1941 |
| 2,355,167 | Keith | Aug. 8, 1944 |
| 2,371,817 | Frey | Mar. 20, 1945 |
| 2,423,156 | Reid | July 1, 1947 |
| 2,428,521 | Latchum | Oct. 17, 1947 |
| 2,519,344 | Berg | Aug. 22, 1950 |
| 2,529,312 | Rupp | Nov. 7, 1950 |
| 2,535,148 | Martin et al. | Dec. 26, 1950 |
| 2,557,171 | Bodle | June 19, 1951 |
| 2,603,310 | Gilmore | July 12, 1952 |
| 2,632,726 | Ringham | Mar. 24, 1953 |
| 2,685,941 | Kassel | Aug. 10, 1954 |
| 2,689,624 | Davis | Sept. 21, 1954 |
| 2,757,754 | Natta | Aug. 7, 1956 |
| 2,775,103 | Koble | Dec. 25, 1956 |
| 2,804,488 | Cobb | Aug. 27, 1957 |
| 2,847,361 | Hengstebeck | Aug. 12, 1958 |